United States Patent Office 3,458,503
Patented July 29, 1969

3,458,503
PREPARATION OF 10β-METHYL-13-POLYCAR-BONALKYL-4-EN-3-ONES
Richard W. Rees, Newtown Square, and Herchel Smith, Wayne, Pa., assignors to American Home Products Corporation, New York, N.Y., a corporation of Delaware
No Drawing. Continuation-in-part of application Ser. No. 551,893, May 23, 1966. This application Mar. 30, 1967, Ser. No. 626,953
Int. Cl. C07c *173/00, 169/12*
U.S. Cl. 260—239.55     4 Claims

ABSTRACT OF THE DISCLOSURE

The preparation of 10β - methyl - 13 - polycarbonalkylgon-4-enes which have anabolic, progestational, antiandrogenic and corticoid activity from the corresponding 13 - polycarbonalkylgon - 5(10) - enes by methylenating the 5(10) - unsaturation and hydrolyzing with mineral acid is described.

---

This application is a continuation-in-part of U.S. application Ser. No. 551,893, filed May 23, 1966.

This invention relates to compositions of matter classified in the art of chemistry as 13-polycarbonalkyl substituted gon-4-en-3-ones.

The invention sought to be patented in a principal process aspect is described as residing in the concept of a sequence of reactions, including the steps of: converting a 13 - polycarbonalkylgon - 5(10) - en - 3β - ol to the corresponding 5β,10β - methano - 13β - polycarbonalkylgonan - 3β - ol by addition of methylene across the 5(10) - unsaturation, selective oxidation of the 3-hydroxy group to 3-keto and hydrolyzing with mineral acid to obtain a 10β - methyl - 13 - polycarbonalkyl - gon - 4 - en - 3 - one.

While the prior art describes a process for preparing testosterone by a procedure superficially similar to that of our invention [Ginsig and Cross, J. Am. Chem. Soc., 87, 4629 (1965)], two distinct differences between what is described therein and the process of our invention may be noted. These are (1) the hydrolysis of the methano bridge is performed with mineral acid instead of base, and (2) the presence of polycarbonalkyl groups at the 13-position.

The process of our invention leads to novel classes of 10β - methyl - 13 - polycarbonalkyl steroids which have valuable steroid hormonal properties.

The invention sought to be patented in a principal composition aspect is described as residing in the concept of a 5β,10β - methano - 13β - polycarbonalkylgonane.

The tangible embodiments of the principal composition of the invention possess the inherent general physical properties of being white crystalline solids, are substantially insoluble in water and are generally soluble in polar solvents, such as dimethylacetamide. Examination of the compounds produced according to the hereinafter described process reveals, upon infrared, ultraviolet, and nuclear magnetic resonance spectrographic analysis, spectral data supporting the molecular structure hereinbefore set forth. For example, the 5β,10β-methano bridge is evident in the n.m.r. spectrum. The aforementioned physical characteristics taken together with the nature of the starting materials and the product obtained therefrom, further confirm the molecular structure hereinbefore set forth.

The tangible embodiments of the principal compositions of the invention possess the applied use characteristic of being intermediates for making compositions which possess the inherent applied use characteristic of exerting qualitatively varying hormonal effects in animals as evidenced by pharmacological evaluation according to standard test procedures, such as anabolic, progestational, and anti-androgenic activity.

The manner of making and using the invention will now be generally described so as to enable a person skilled in the art of chemistry to make and use the same, as follows:

The process of the invention is illustrated schematically for a specific embodiment thereof, as follows:

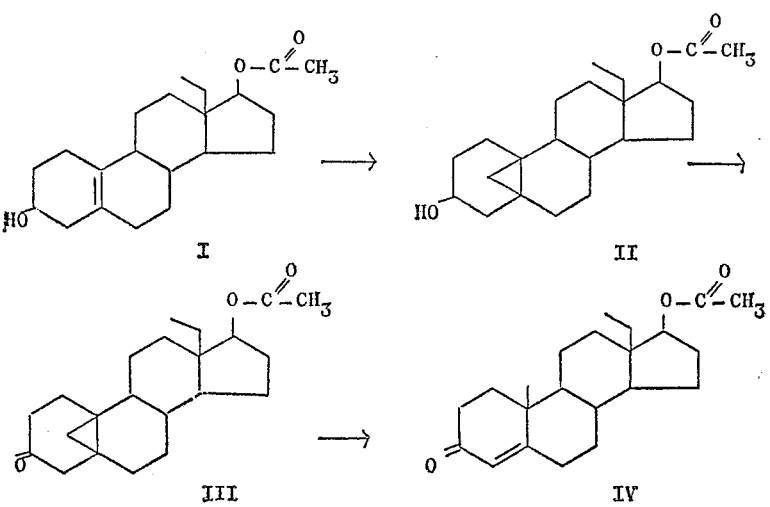

Referring now to the above schematic diagram, wherein the compounds are assigned Roman numerals sequentially for identification, the starting materials for the process of the invention, i.e., 3β-hydroxy-13-polycarbonalkylgon-5(10)-enes (I) are prepared from appropriate 3-methoxy - 13β - polycarbonalkylgona - 2,5(10) - dienes, which are described in co-pending United States application Ser. No. 540,924, filed Apr. 7, 1966, by conversion with methanolic oxalic acid to the corresponding gon-5(10)-en-3-one, and reduction of the latter compound with a metal hydride reducing combination. If a group such as hydroxy, i.e., one labile to oxidation in the process of the invention, is present in the starting compound in positions other than the 3-position, it can be protected by converting it to an ester or by other methods known to those skilled in the art of chemistry before forming the 5(10)-en-3-ol. The reagent used to form the methano bridge across the 5(10)-position is prepared by adding a methylene dihalide, such as methylene di-iodide or dibromide, to a vigorously stirred suspension of zinc-copper couple prepared by Le Goff's method [J. Org. Chem., 29, 2048 (1964)] in a solvent, such as ether or tetrahydrofuran. The reaction is initiated by slight external heating and when it subsides, the appropriate 5(10)-en-3-ol in ether is added. About half of the solvent is distilled off and the residue is refluxed for from 1 to about 3 hrs. The reaction mixture is added to water and extracted to recover the product (II), which can be purified by recrystallization from a non-polar solvent. The 3-ol group is oxidized to 3-one (III) preferably with chromium trioxide in pyridine, and purified by recrystallization from a non-polar solvent, such as ether-pentane. Mineral acid hydrolysis of the 5,10-methano bridge then gives the desired 10-methyl-13-polycarbonalkyl-4-en-3-ones (IV).

It will be apparent to those skilled in the art that while the process has been specifically described only for compounds wherein the 13-polycarbonalkyl group is ethyl, the 13-polycarbonalkyl group can be of varying chain length, such as for example propyl, isopropyl, butyl, isobutyl, pentyl, etc., even cetyl, and for the process of the invention when such groups are present in the starting material, they will be correspondingly present in the intermediates and in the final products and when so used, the process is the full equivalent of the process particularly described and claimed.

It will also be apparent to those skilled in the art that the starting compounds can bear groups unaffected by the process reactions, such as for example but not limited thereto, 6- or 7-methyl, or the starting compounds can bear other labile groups which can be protected, if necessary, to allow selective oxidation at the 3-position, such as for example but not limited thereto, the 11-hydroxy, or 16-hydroxy which can be protected by eserification in analogous fashion to which the 17-hydroxy group is protected in the description hereinabove, and these variations for the process of the invention, except for the limitation expressed above, are full equivalents of the process as particularly described.

It will also be apparent to those skilled in the art of chemistry that if the 17-position of the starting material is substituted only with hydrogen or with a group inert to the subsequent process reactions that protection of the 17-position is not required, and that when a starting material thus substituted is employed in the process of the invention, the variation is the full equivalent of the process as particularly described and claimed.

Furthermore, it will aso be apparent to those skilled in the art of chemistry that a group at the 17-position or other position can be modified after introduction of the methano bridge and before hydrolysis provided other groups present in the molecule are either non-reactive in the modification process or if reactive, are protected by known methods. Thus in the 17-keto compound (III) shown in the schematic illustration, provided the 3-keto group is protected as for example by forming the 3-ethylene ketal, the 17-acetoxy group can be hydrolyzed with base and oxidized to the 17-keto, which in turn may be converted to 17-acetyl, etc.

The following preparations exemplify how starting materials for the process of the invention may be prepared and the following examples illustrate the best mode of carrying out the process of the invention and for making and using the composition of the invention.

Preparation 1.—17β-acetoxy-13β-ethylgon-
5(10)-en-3α and β-ols

Add sodium borohydride (7.0 g.) portionwise with stirring to 17β - acetoxy - 13β - ethylgon-5(10-en-3-one (9.5 g.) in methanol (400 ml.). Keep the mixture for 1 hr. at room temperature, then pour it into water and extract the mixture with chloroform. Absorb the oily product (9 g.) in benzene-hexane (1:9) on a silica gel column. Elute successively with benzene-hexane mixtures and benzene-ethyl acetate (9:1) to obtain the title product as crystals, approximately equal amounts of each epimer.

Preparation 2.—17β-1′-acetoxyethyl-13β-ethyl-
3-methoxygona-2,5(10)-diene

Keep 13β - ethyl - 17β-1′-hydroxyethyl-3-methoxygona-2,5(10)-diene (2 g.) in acetic anhydride (8 ml.)-pyridine (25 ml.) for 16 hr. at room temperature. Pour the mixture on to crushed ice, add water and extract with ether. Evaporate the washed and dried extracts to obtain the title product.

Preparation 3.—17β-1′-acetoxyethyl-13β-ethylgon-
5(10)-en-3-one

Stir 17β - 1′-acetoxyethyl-13β-ethyl-3-methoxygona-2,5(10)-diene (2 g.) with methanol (200 ml.)-water (30 ml.) containing oxalic acid dihydrate (3.7 g.) at room temperature until dissolved. Add brine (1 l.) and extract the mixture thoroughly with ether. Evaporate the washed and dried extracts under reduced pressure to obtain the title product.

Preparation 4.—13β-ethyl-17β-1′-hydroxyethylgon-
5(10)-en-3-one

Stir 13β - ethyl-17β-1′-hydroxyethyl-3-methoxygona-2,5(10)-diene (2 g.) with methanol (200 ml.)-water (30 ml.) containing oxalic acid dihydrate (3.7 g.) at room temperature until dissolved. Add brine (1 l.) and extract the mixture thoroughly with ether. Evaporate the washed and dried extracts under reduced pressure to obtain the title proudct.

Preparation 5.—17β-1′-acetoxyethyl-13β-ethylgon-
5(10)-en-3-one

Keep 13β-ethyl-17β-1′-hydroxyethylgon-5(10)-en-3-one (1 g.) in acetic anhydride (4 ml.)-pyridine (20 ml.) for 16 hr. at room temperature. Add the mixture to crushed ice and extract with ether. Evaporate the washed and dried extracts to obtain the title product.

Preparation 6.—17β-1′-acetoxyethyl-13β-ethyl-
gon-5(10)-en-3α and β-ols

Add sodium borohydride (0.7 g.) portionwise with stirring to 17β-1′-acetoxyethyl - 13β-ethylgon-5(10)-en-3-one (1 g.) in methanol (40 ml.). After 1 hr. pour the mixture into water and extract with chlorofrom. Chromatograph the product on silica gel eluting with benzene-hexane mixtures, pure benzene, and benzene-ethyl acetate mixtures to obtain the title product.

Example 1.—17β-acetoxy-13β-ethyl-5β,10β-
methanogonan-3-one

Add methylene di-iodide dropwise to a vigorously stirred suspension in ether (150 ml.) of zinc-copper couple (7.5 g.) [perpared by Le Goff's method, J. Org. Chem., 29, 2048 (1964)], and initiate the reaction by slight external heating. Upon its completion (about 30 min.) add 17β-acetoxy-13β-ethylgon-5(10)-en-3-ol (1.7 g.) in ether (80 ml.) over 15 min., slowly distilling off 115 ml. of ether during this addition. Reflux the mixture for a further 1 hr., slowly add ether (100 ml.) then slowly distill off 100 ml. of ether. Reflux for a further 1 hr. with stirring, then cautiously pour the cooled mixture on to crushed ice and extract with chloroform. Evaporate the washed and dried extracts and recrystallize the residue from hexane-ether to obtain a crystalline product (0.7 g.), M.P. 130–136°, containing 17β-acetoxy-13β-ethyl-5β,10β-methanogonan-3β-ol. Keep the foregoing product (0.65 g.) overnight at room temperature in pyridine (75 ml.) containing chromium trioxide (1.5 g.) to give as product an oil, recrystallize from ether pentane and obtain the title product (0.08 g.), M.P. 130–137°.

Example 2.—17β-acetoxy-13β-ethyl-10β-methylgon-4-en-3-one

Bubble hydrogen chloride through chloroform (15 ml.) containing 17β-acetoxy-13β-ethyl-5β,10β-methanogonan-3-one (0.06 g.) for 1 hr. and keep the solution at room temperature for 63 hr. Evaporate the washed and dried solution to obtain a product (0.04 g.) containing the title product in admixture with the corresponding 17-ol. Reacetylate the latter by keeping the mixture at room temperature for 16 hr. in acetic anhydride (0.25 ml.)-pyridine (0.3 ml.) to give the title product as crystals, M.P. 158–161° (from ether), $\lambda_{max}$ 241 mμ (ε 15,400), IR bands at 3.45, 5.75, 5.92, 6.20 and 8.05μ, proton NMR signals centered at 0.94 (3-proton triplet, J=6.5 cps., 18a-CH$_3$), 1.19 (3-proton singlet, 19-CH$_3$), 2.02 (3-proton singlet, acetate CH$_3$), 4.68 (1-proton triplet, J=8 cps., 17H), and 5.73 (1-proton singlet, 4H).

*Analysis.*—Calcd. for $C_{22}H_{32}O_3$: C, 76.7; H, 9.4. Found: C, 76.8; H, 9.1.

Example 3.—17β-1'-acetoxyethyl-13β-ethyl-5β,10β-methanogonan-3-one

Use the procedure of Example 1 to convert 17β-1'-acetoxyethyl-13β-ethylgon-5(10)-en-3-ol (2 g.) to a crude product containing 17β-1'-acetoxyethyl-13β-ethyl-5β,10β-methanogonan-3β-ol. Keep this product overnight at room temperature in pyridine (75 ml.) containing chromium trioxide (1.5 g.). Add ethyl acetate and filter the mixture through neutral alumina. Evaporate the ethyl acetate solution and chromatograph the residue on silica gel eluting with benzene-hexane mixtures, pure benzene, and benzene-ethyl acetate mixtures to obtain the title product.

Example 4.—17β-1'-acetoxyethyl-13β-ethyl-10β-methylgon-4-en-3-one

Bubble hydrogen chloride through chloroform (100 ml.) containing 17β-1'-acetoxyethyl-13β-ethyl-5β,10β-methanogonan-3-one (0.5 g.) for 3 hr. and keep the solution at room temperature for 68 hr. Evaporate the washed and dried solution. Keep the residue in acetic anhydride (2.5 ml.)-pyridine (3 ml.) for 16 hr. Chromatograph the product on neutral alumina eluting with benzene and benzene-ether mixtures to obtain the title product.

Example 5.—17β-acetoxy-3,3-ethylenedioxy-13-ethyl-17β-hydroxy-5β,10β-methanogonane Stir and reflux a solution of 8.5 g. of 17β-acetoxy-13β-ethyl-5β,10β-methanogona-3-one in 1 liter of benzene, 50 ml. of ethylene glycol and 0.5 g. of p-toluene sulfonic acid with a Dean-Stark water separator for 16 hours. Cool the solution, dilute with ether and wash with 5% potassium bicarbonate and water. Evaporate the dried ether solution to obtain 10.3 g. of yellow oily crystals and crystalline from acetone-hexane to obtain 6.0 g. of the title product, M.P. 120–123°.

Example 6.—3,3-ethylenedioxy-13-ethyl-5β,10β-methanogan-17-one

Reflux a solution of 10.0 g. of crude 17-1'-acetoxy-3,3-ethylenedioxy-13-ethyl-17β - hydroxy - 5β,10β-methanogonane in 200 ml. of methanol, 20 ml. of water and 2.0 g. of potassium hydroxide for ¾ hour. Evaporate the mixture to dryness, dissolve in ether and wash with water. Evaporate the dried ether solution to obtain 7.9 g. of yellow solid whose infrared spectrum is devoid of any carbonyl absorption.

Add a solution of the above 7.9 g. of crude 17-ol-3-ketal in 80 ml. of pyridine to a stirred ice-cooled solution of 15.0 g. chromium trioxide in 500 ml. of pyridine and stir for 15 minutes at 0° and then at room temperature for 2 hours. Add the reaction mixture to 2 liters of water and extract with ether. Wash the ether extract with 5% hydrochloric acid, water, dry and evaporate to obtain 7.2 g. of white solid and crystallize from acetone-hexane to obtain 5.2 g. of the title product, M.P. 170–172, $\lambda_{max}^{KBr}$ 5.8, 6.90, 8.95, 9.85μ

Found: C, 76.78; H, 9.21. $C_{22}H_{32}O_3$ requires: C, 76.70; H, 9.36.

Example 7.—13,17-diethyl-3,3-ethylenedioxy-5β,10β-methanogon-17(20)-ene

Swirl sodium hydride-oil dispersion (4.4 g.) in 20 ml. dry hexane and decant the hexane. Treat the washed sodium hydride with 75 ml. of dimethyl sulfoxide and stir and heat under N$_2$ at 80° until all of the NaH reacts giving a green solution. Cool the reaction mixture to room temperature and treat with a solution of 40 g. of ethyl-triphenylphosphonium bromide in 150 ml. of dimethyl sulfoxide. Add a solution of 4.4 g. of dl-3,3-ethylenedioxy-13-ethyl-5β,10β-methanogon-17-one in 100 ml. of benzene and stir the mixture under N$_2$ at room temperature for 2½ hrs. and then at 80° for 17 hours. Cool to room temperature, add water and extract the mixture with ether. Evaporate the water-washed and dried extract to obtain 12 g. of oil, dissolve in benzene and pass through a short column of neutral alumina (Act. 1) to obtain 9.0 g. of crystalline solid. Crystallize the crude product from ether-hexane to obtain 2.9 g. of triphenylphosphine oxide as white needles, M.P. 155–156°. Evaporate the filtrate, chromatograph the residue on neutral alumina (Act. 3) and elute with hexane to give 4.4 g. of white crystalline solid. Recrystallize from hexane to obtain 1.0 g. of the title product, M.P. 89–92°, whose IR is devoid of any ketone absorption.

Example 8.—3,3-ethylenedioxy-13-ethyl-17β-(1-hydroxyethyl)-5β,10β-methanogonane

Treat a stirred solution of 3.5 g. of crude 13,17-diethyl - 3,3-ethylenedioxy-5β,10β-methanogon-17(20)-ene in 100 ml. of dry THF, under N$_2$, with 25 ml. of 1 M diborane-tettrahldrofuran over 10 minutes. Stir under N$_2$ at room temperature for 1 hr., treat the mixture with 70 ml. of 10% sodium hydroxide over 15 min., dropwise at first. Cool the solution to 0° and treat slowly with 55 ml. of 30% hydrogen peroxide over 20 minutes keeping the reaction temperature under 10°. Stir at 0° for 1 hr., dilute the mixture with ether, wash with water, 10% sodium bisulfite, water and dry over sodium sulfate. Evaporate to obtain 3.7 g. of solid which is chromatographed on neutral alumina (Act. 3) and elute with benezene to obtain 2.4 g. of the title product, M.P. 149–151°, $\lambda_{max}^{KBr}$ 2.90, 6.90 9.00μ

Found: C, 77.08; H, 10.04. $C_{24}H_{38}O_3$ requires: C, 76.96; H, 10.23.

Example 9.—dl-17β-acetyl-13β-ethyl-10β-methylgon-4-en-3-one

Add a solution of 2.6 g. of 3,3-ethylenedioxy-13-ethyl-17β-(1-hydroxyethyl)-5β,10β-methanogonane in 20 ml. of chloroform to 250 ml. of chloroform saturated with hydrogen chloride and the mixture kept at room temperature for 17 hours. Wash the mixture with 5% potassium bicarbonate, water, dry and evaporate to obtain 2.6 g. of oil whose IR showed $\alpha,\beta$-unsaturated ketone absorption at 6.0µ.

Cool a solution of the above 2.6 g. of crude ketone in 100 ml. of acetone to 0° and treat with Jones reagent until a red color persists. Stir the mixture at 0° for 15 min., treat with isopropyl alcohol until the color turns green, dilute with ether, wash with water, dry and evaporate to obtain 2,1 g. of solid. Recrystallize from acetone-hexane to obtain 0.82 g. of the title product, M.P. 178–180°, $\lambda_{max.}^{KBr}$ 5.90, 6.00, 6.20µ, $\lambda_{max.}^{EtOH}$ 241 mµ ($\epsilon$ 15,800)

Found: C, 80.57; H, 9.70. $C_{22}H_{32}O_2$ requires: C, 80.44; H, 9.83. NMR: 42 (triplet), 73, 136, 354 cps.

The subject matter which the applicants regard as their invention is pointed out and particularly claimed as follows:

1. 17$\beta$-1'-acetoxyethyl-13$\beta$-ethyl-5$\beta$,10$\beta$-methanogonan-3$\beta$-ol.

2. 17$\beta$-1'-acetoxyethyl-13$\beta$-ethyl-5$\beta$,10$\beta$-methanogonan-3-one.

3. 13,17-diethyl-3,3-ethylenedioxy-5$\beta$,10$\beta$-methanogon-17(20)-ene.

4. 3,3 - ethylenedioxy - 13-ethyl-17$\beta$-(1-hydroxyethyl) - 5$\beta$,10$\beta$-methanogonane.

References Cited

UNITED STATES PATENTS 3,184,485  5/1965  Knox _____ 260—397.4

OTHER REFERENCES

Ginsig et al.: JACS 87, pp. 4630–31 (1965).

HENRY A. FRENCH, Primary Examiner

U.S. Cl. X.R.

260—397.4, 397.5, 999